(12) United States Patent
Tokito

(10) Patent No.: US 10,913,365 B2
(45) Date of Patent: Feb. 9, 2021

(54) RAILROAD VEHICLE CONTROL DEVICE

(71) Applicant: MITSUBISHI ELECTRIC CORPORATION, Tokyo (JP)

(72) Inventor: Kosuke Tokito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 464 days.

(21) Appl. No.: 15/750,328

(22) PCT Filed: Aug. 10, 2015

(86) PCT No.: PCT/JP2015/072625
§ 371 (c)(1),
(2) Date: Feb. 5, 2018

(87) PCT Pub. No.: WO2017/026026
PCT Pub. Date: Feb. 16, 2017

(65) Prior Publication Data
US 2018/0222328 A1      Aug. 9, 2018

(51) Int. Cl.
*B60L 50/10*      (2019.01)
*B60L 9/18*       (2006.01)
*B61C 7/04*       (2006.01)

(52) U.S. Cl.
CPC .............. *B60L 50/10* (2019.02); *B60L 9/18* (2013.01); *B61C 7/04* (2013.01); *B60L 2200/26* (2013.01); *B60L 2210/10* (2013.01); *B60L 2210/30* (2013.01); *Y02T 10/70* (2013.01);

(Continued)

(58) Field of Classification Search
CPC .............. B60L 50/10; B60L 9/18; B61C 7/04
See application file for complete search history.

(56) References Cited

U.S. PATENT DOCUMENTS

| 8,587,260 B2 * | 11/2013 | Kumar | B60L 58/18 |
| | | | 320/155 |
| 10,112,493 B2 * | 10/2018 | Tokito | B60L 53/20 |
| 10,279,688 B2 * | 5/2019 | Tokito | B60L 58/25 |

(Continued)

FOREIGN PATENT DOCUMENTS

| CN | 103660950 A | 3/2014 |
| EP | 2 679 459 A2 | 1/2014 |

(Continued)

OTHER PUBLICATIONS

Office Action dated Oct. 1, 2019, issued in corresponding Indian Patent Application No. 201847002869, 6 pages.

(Continued)

*Primary Examiner* — Scott A Browne
(74) *Attorney, Agent, or Firm* — Buchanan Ingersoll & Rooney PC

(57) ABSTRACT

A second power conversion device converts electric power supplied from a power source connected to an input side of the second power conversion device, to supply the converted electric power to a first power storage device. A first contactor is closed, such that a smoothing capacitor is charged with electric power stored in the first power storage device. A controller controls a first power conversion device to cause the first power conversion device to perform power conversion of electric power stored in the smoothing capacitor and to supply the converted electric power to a power generator.

6 Claims, 6 Drawing Sheets

(52) U.S. Cl.
CPC ............ *Y02T 10/7072* (2013.01); *Y02T 30/00* (2013.01); *Y10S 903/902* (2013.01)

(56) References Cited

U.S. PATENT DOCUMENTS

| | | | |
|---|---|---|---|
| 2010/0019726 A1 | 1/2010 | Kumar et al. | |
| 2012/0090499 A1 | 4/2012 | Shimada et al. | |
| 2013/0049458 A1* | 2/2013 | Koga | B60L 9/28 307/9.1 |
| 2014/0060378 A1 | 3/2014 | Daigle et al. | |
| 2015/0069935 A1* | 3/2015 | Yamane | B60W 10/08 318/139 |

FOREIGN PATENT DOCUMENTS

| | | | | |
|---|---|---|---|---|
| JP | H05-176555 A | | 7/1993 | |
| JP | H11-215607 A | | 8/1999 | |
| JP | 2007-166885 A | | 6/2007 | |
| JP | 2007166885 A | * | 6/2007 | ............. B60L 50/13 |
| JP | 2013-051844 A | | 3/2013 | |
| JP | 2013-102686 A | | 5/2013 | |
| JP | 2014-011828 A | | 1/2014 | |
| JP | 2014011828 A | * | 1/2014 | |

OTHER PUBLICATIONS

Extended European Search Report dated Feb. 22, 2019, issued by the European Patent Office in corresponding European Application No. 15900980.2. (8 pages).
Office Action dated Mar. 16, 2020, by the Chinese Patent Office in corresponding Chinese Patent Application No. 201580082126.0 and English translation of the Office Action. (10 pages).
Office Action dated Nov. 1, 2019, issued in corresponding Chinese Patent Application No. 201580082126.0, 11 pages including 3 pages of English translation.
Notification of Reasons for Refusal for Japanese Patent Application No. 2017-534050, dated Oct. 24, 2017.
International Search Report (PCT/ISA/210) dated Oct. 27, 2015, by the Japanese Patent Office as the International Searching Authority for International Application No. PCT/JP2015/072625.
Written Opinion (PCT/ISA/237) dated Oct. 27, 2015, by the Japanese Patent Office as the International Searching Authority for International Application No. PCT/JP2015/072625.

* cited by examiner

RAILROAD VEHICLE CONTROL DEVICE

TECHNICAL FIELD

The present disclosure relates to a railroad vehicle control device for a railroad vehicle with an internal combustion engine.

BACKGROUND ART

A railroad vehicle control device mounted on a railroad vehicle that travels on a non-electrified train route having no overhead lines converts alternating current power generated by a generator to supply the converted alternating current power to a main electric motor to drive the main electric motor, the generator being driven by an internal combustion engine such as a diesel engine. Examples of the generator include a separately excited synchronous generator that generates electromotive force by rotation. Also, a permanent magnet synchronous generator may be used as the above generator in order to achieve reduction in size and in weight and achieve high efficiency.

A railroad vehicle driving device disclosed in Patent Literature 1 includes: an induction generator driven by an engine; a first power conversion device converting, into direct current power, alternating current power output by the induction generator; and a smoothing capacitor smoothing the direct current power output by the first power conversion device. The railroad vehicle driving device disclosed in Patent Literature 1 has a structure in which: the smoothing capacitor is charged by power storage means supplying electric power to a control device included in the railroad vehicle; and electric power stored in the smoothing capacitor is supplied to the induction generator as electric power for starting power generation so that the induction generator is excited.

CITATION LIST

Patent Literature

Patent Literature 1: Unexamined Japanese Patent Application Kokai Publication No. 2014-011828

SUMMARY OF INVENTION

Technical Problem

In the railroad vehicle driving device disclosed in Patent Literature 1, a contactor and a resistor are connected to each other in series between the power storage means and the smoothing capacitor. Therefore, the power storage means and the smoothing capacitor are electrically connected to each other. While the railroad vehicle is moving, a voltage of the smoothing capacitor is high but a voltage of the power storage means is low in the railroad vehicle driving device. The railroad vehicle driving device needs to secure insulation between: a high voltage circuit including the smoothing capacitor; and a low voltage circuit including the power storage means even in cases where a contactor sticks or is wrongly closed.

In a case where an internal combustion engine does not include any starter, the internal combustion engine is started up by power storage means. A voltage of such power storage means is generally low and is not more than DC 100 V. As a result, the internal combustion engine needs a large amount of current as much as several hundred amperes in starting up the internal combustion engine. Accordingly, an internal resistance of the power storage means causes a considerable temporary drop in the terminal voltage in the configuration of the railroad vehicle driving device disclosed in Patent Literature 1, that, in consequence, can negatively affect a control device included in the vehicle and connected to the power storage means.

In order to solve the aforementioned problem, an objective of the present disclosure is to prevent unintentional electrical contact between a high voltage circuit and a low voltage circuit that are included in a railroad vehicle control device mounted on a railroad vehicle with an internal combustion engine, while supplying electric power to a power generator driven by the internal combustion engine.

Solution to Problem

In order to achieve the aforementioned objective, a railroad vehicle control device of the present disclosure includes a first power conversion device, a smoothing capacitor, a second power conversion device, a first power storage device, a first contactor, and a controller. A primary side of the first power conversion device is connected to a power generator driven by an internal combustion engine to generate alternating current, and the first power conversion device performs bidirectional power conversion between the primary side and a secondary side of the first power conversion device. The smoothing capacitor is connected to terminals of the secondary side of the first power conversion device. The second power conversion device converts electric power supplied from a power source connected to an input side of the second power conversion device and then outputs the converted electric power, with the input side and an output side of the second power conversion device insulated from each other. The first power storage device is connected to the smoothing capacitor in parallel between terminals of the secondary side of the first power conversion device. The first power storage device is connected to terminals of the output side of the second power conversion device, and electric power output by the second power conversion device is supplied to the first power storage device so that the first power storage device is charged. The first contactor switches on and off an electrical pathway located between the smoothing capacitor and the first power storage device. The controller controls the first power conversion device and the second power conversion device. The controller controls the first power conversion device after the smoothing capacitor is charged by supplying to the smoothing capacitor electric power stored in the first power storage device by closing the first contactor, so that the first power conversion device converts the electric power stored in the smoothing capacitor and supplies the converted electric power as electric power for driving the power generator.

Advantageous Effects of Invention

According to the present disclosure, the railroad vehicle control device includes the first power storage device charged by the second power conversion device that performs power conversion with the input and output sides of the second power conversion device insulated from each other and the railroad vehicle control device charges the smoothing capacitor with electric power stored in the first power storage device and then convert the electric power stored in the smoothing capacitor to supply the converted electric power to the power generator. This enables prevention of unintentional electrical contact between a high voltage circuit and low voltage circuit while supplying electric power to the power generator.

DESCRIPTION OF EMBODIMENTS

Embodiments of the present disclosure are described in detail hereinafter with reference to the drawings. Components that are the same or equivalent are assigned the same reference signs throughout the drawings.

Embodiment 1

Figure 1:
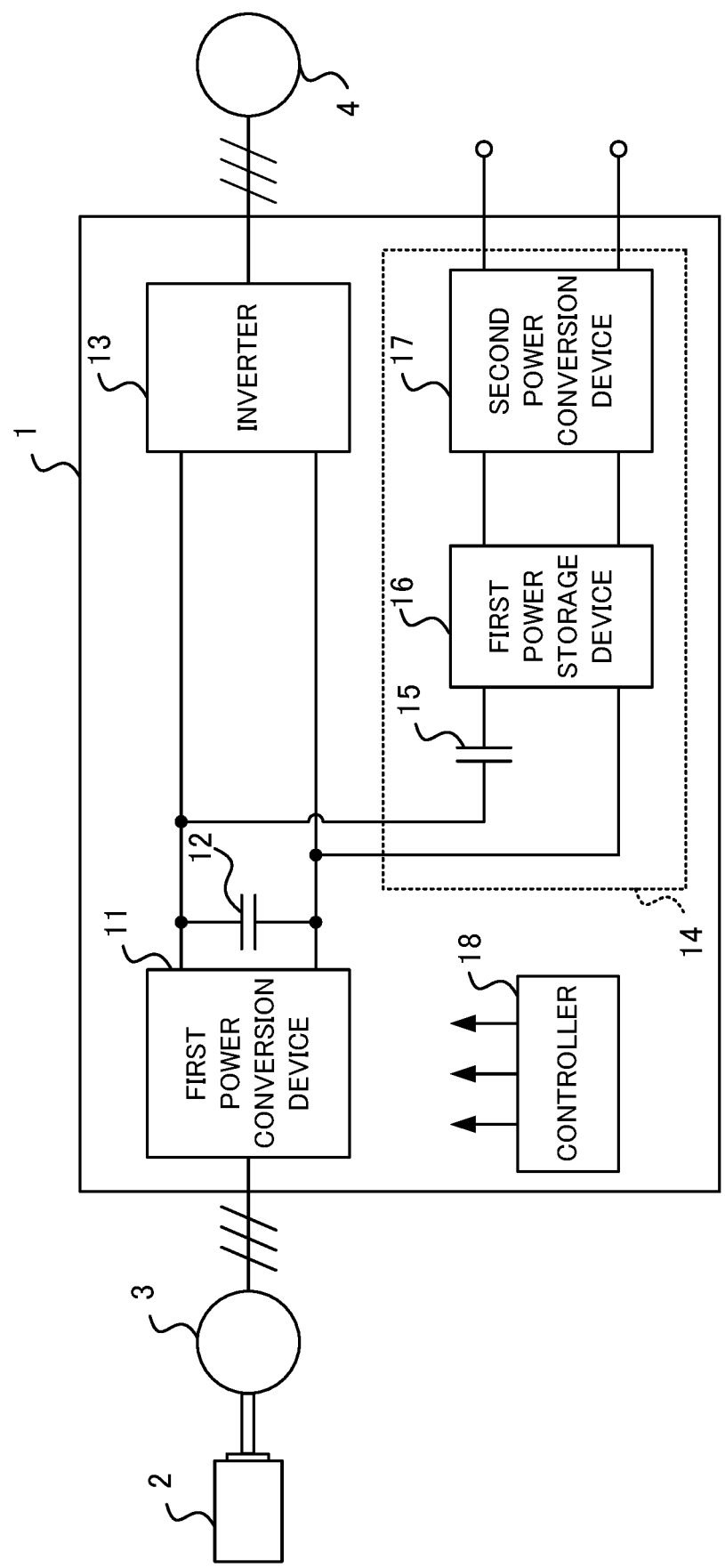
FIG. 1 is a block diagram illustrating an example configuration of a railroad vehicle control device according to Embodiment 1 of the present disclosure.

FIG. 1 is a block diagram illustrating an example configuration of a railroad vehicle control device according to Embodiment 1 of the present disclosure. A railroad vehicle control device 1 is incorporated into a railroad vehicle driven by power of an internal combustion engine 2 such as a diesel engine. The internal combustion engine 2 does not include any start-up device such as a starter in Embodiment 1. Accordingly, the railroad vehicle control device 1 starts up the internal combustion engine 2. The railroad vehicle control device 1 includes: a first power conversion device 11 the primary side of which is connected to a power generator 3 driven by the internal combustion engine 2 to generate alternating current power; a smoothing capacitor 12 connected to terminals of the secondary side of the first power conversion device 11; an inverter 13 that is a power consuming device connected in parallel to the smoothing capacitor 12 between the terminals of the secondary side of the first power conversion device 11; and a start-up controller 14. The start-up controller 14 includes: a first power storage device 16 connected, via a first contactor 15, in parallel to the smoothing capacitor 12 between the terminals of the secondary side of the first power conversion device 11; and a second power conversion device 17.

In the example configuration illustrated in FIG. 1, the first power conversion device 11 is an Alternating Current-Direct Current (AC-DC) converter performing bidirectional power conversion between the primary and secondary sides of the first power conversion device 11. The smoothing capacitor 12 smooths direct current power output by the first power conversion device 11, and smooths electric power discharged by the first power storage device 16. Electric power stored in the smoothing capacitor 12 is made to convert from direct current power into alternating current power by the inverter 13 and then the inverter 13 supplies the alternating current power as electric power for driving an electric motor 4. The second power conversion device 17 converts electric power supplied from a power source connected to the input side of the second power conversion device 17 with the input side and the output side of the second power conversion device 17 insulated from each other, and then the second power conversion device 17 supplies the converted electric power to the first power storage device 16 connected to terminals of the output side of the second power conversion device 17. In the example configuration illustrated in FIG. 1, the second power conversion device 17 is a DC-DC converter.

Figure 2:
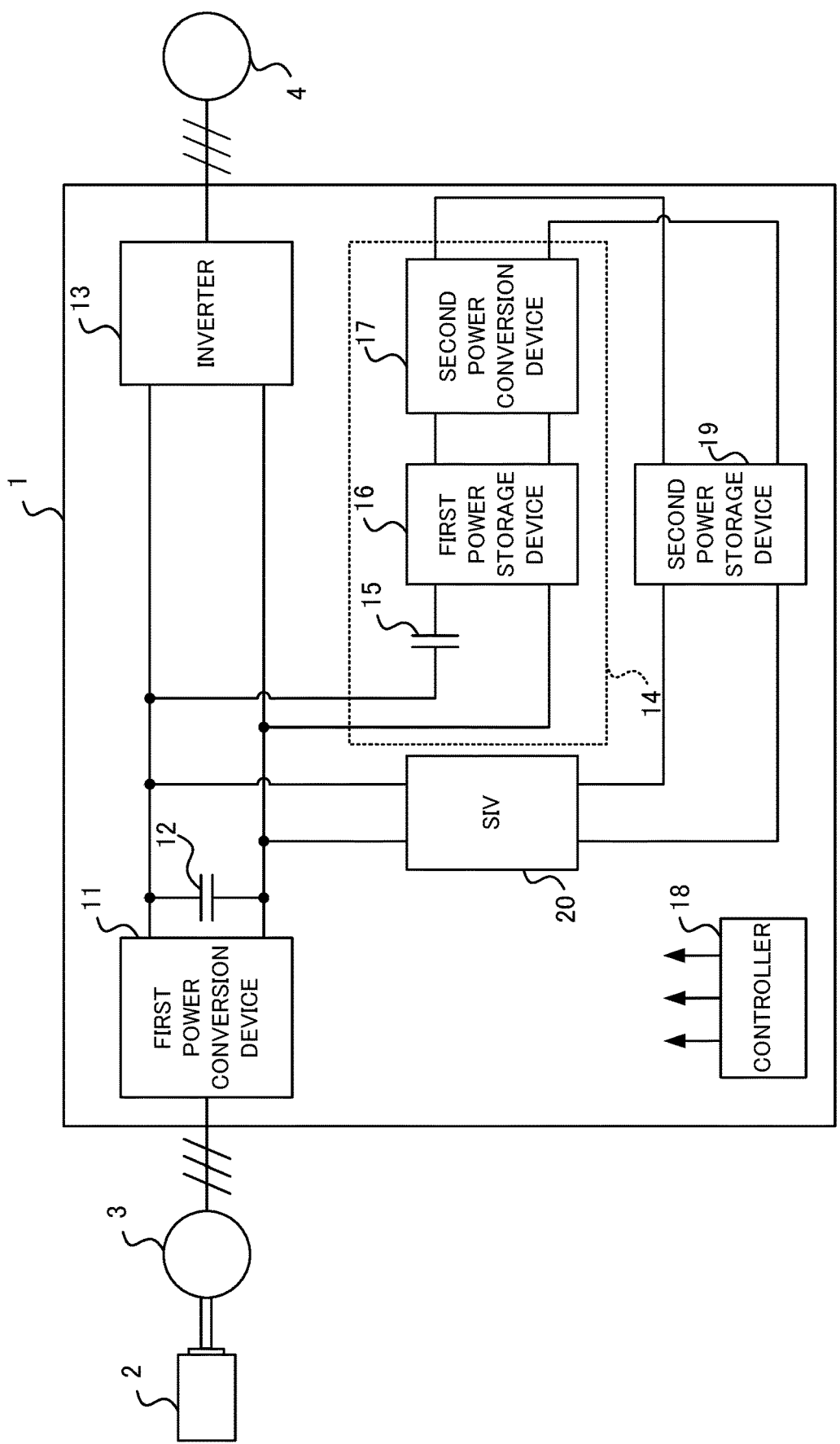
FIG. 2 is a block diagram illustrating an example configuration of the railroad vehicle control device according to Embodiment 1.

A power source connected to the input side of the second power conversion device 17 is, for example, a power storage device for supplying electric power to a control device included in the railroad vehicle. FIG. 2 is a block diagram illustrating an example configuration of the railroad vehicle control device according to Embodiment 1. In the example of FIG. 2, the power source connected to the input side of the second power conversion device 17 is a second power storage device 19. The second power storage device 19 is charged by a transfer circuit during the driving of a power generator 3 with the input side and the output side of the transfer circuit insulated from each other, the transfer circuit being used for converting electric power supplied to the terminals of the secondary side of the first power conversion device 11. In the example of FIG. 2, the second power storage device 19 is charged with electric power output by a static inverter (SW) 20. The second power storage device 19 supplies electric power to the control device included in the railroad vehicle, the control device not being illustrated in the drawings.

A controller 18 controls the first power conversion device 11, the inverter 13 and the second power conversion device 17. The controller 18 includes: a processor including a central processing unit (CPU), an internal memory and the like; and a memory such as a random access memory (RAM), a flash memory or the like. The controller 18 executes a control program stored in the memory to transmit control signals to switching elements respectively included in the first power conversion device 11, the inverter 13 and the second power conversion device 17 to control the first power conversion device 11, the inverter 13 and the second power conversion device 17.

Figure 3:
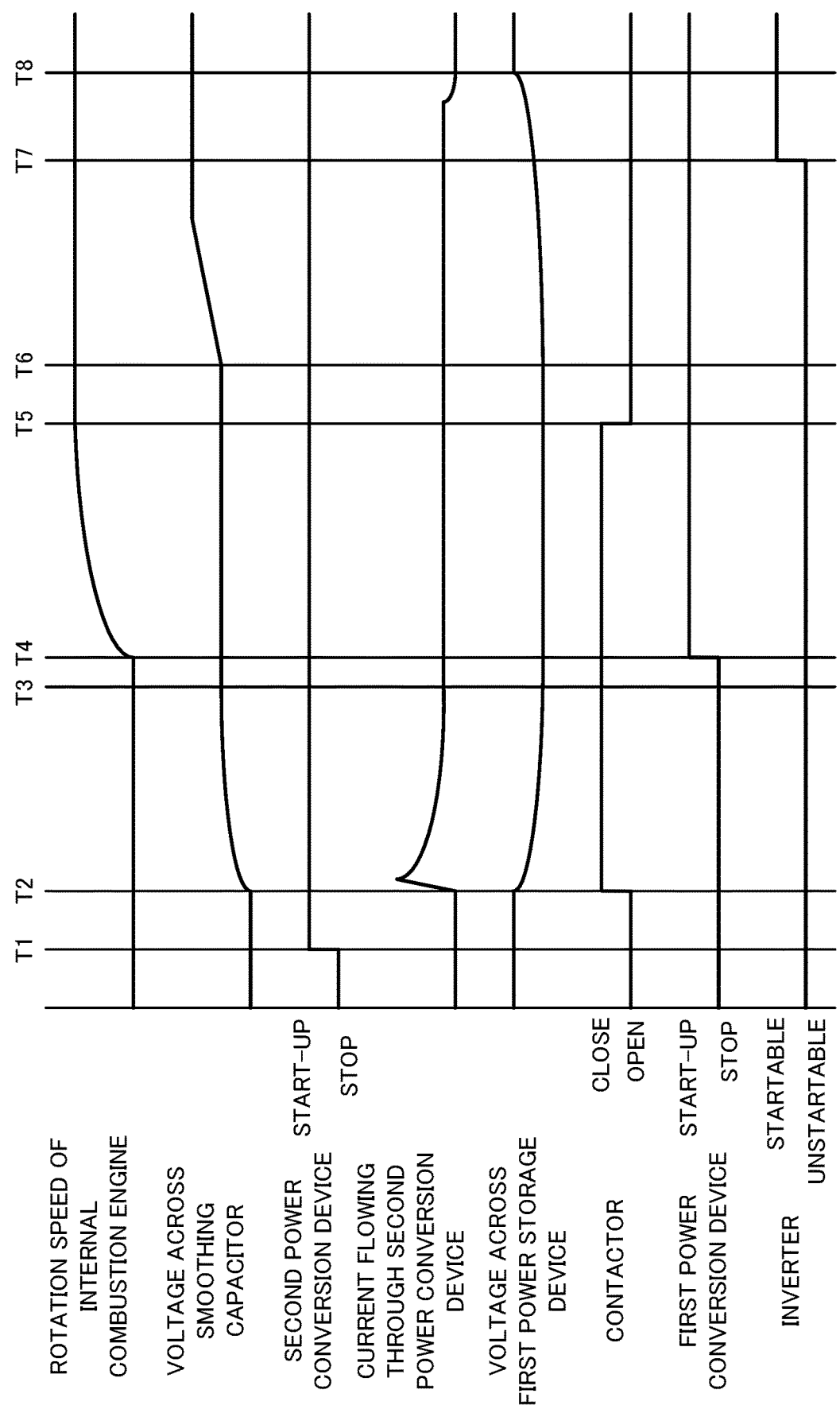
FIG. 3 is a timing chart illustrating operations performed by the railroad vehicle control device according to Embodiment 1 in starting up an internal combustion engine.

FIG. 3 is a timing chart illustrating operations performed by the railroad vehicle control device according to Embodiment 1 in starting up the internal combustion engine. Operations for starting up the internal combustion engine 2 by the railroad vehicle control device 1 are described below using FIG. 3. The second power storage device 19 is charged with a sufficient amount of electric power. At time T1, the railroad vehicle control device 1 begins to start up the internal combustion engine 2, for example, in response to an engine start-up operation initiated by a crew. In response to the start-up operation by the crew, the controller 18 for example outputs a control signal, and then the control signal causes the second power conversion device 17 to start up. The controller 18 controls the second power conversion device 17, such that the second power conversion device 17 converts electric power stored in the second power storage device 19 to supply the converted electric power to the first power storage device 16. The first power storage device 16 is charged, for example, using a constant voltage charging method. Preferably, a restriction is imposed on an amount of flowing current in accordance with a restriction on electric power supplied to the second power storage device 19, capacity of the second power conversion device 17 or the like.

When the first contactor 15 is closed at time T2, charging of the smoothing capacitor 12 starts so that the smoothing capacitor 12 is charged with electric power stored in the first power storage device 16. After the charging of the smoothing capacitor 12 is finished at time T3, the first power conversion device 11 starts up at time T4. The controller 18 controls the first power conversion device 11, such that the first power conversion device 11 converts electric power stored in the smoothing capacitor 12 and then supplies the converted electric power as electric power for driving the power generator 3. The internal combustion engine 2 is started up by torque output by the power generator 3 as a result of the supply of electric power to the power generator 3. Afterward, when the internal combustion engine 2 runs at a stable rotation speed at time T5, the first contactor 15 is opened. For example, a determination can be made as to whether the rotation speed of the internal combustion engine 2 is stable based on whether variations in the rotation speed of the internal combustion engine 2 are within a certain range. A high voltage circuit including the smoothing capacitor 12 and a low voltage circuit including the second power storage device 19 are insulated from each other by opening the first contactor 15.

After opening the first contactor 15, the controller 18 controls the first power conversion device 11 at time T6, so that the first power conversion device 11 starts to convert electric power supplied from the power generator 3 such that voltage of the smoothing capacitor 12 has a constant value of, for example, DC 600 V. As a result, the inverter 13 is put in a state in which the inverter can be started up, at time T7. Afterward, when a powering command is inputted via operation by the crew, the inverter 13 starts up and drives the electric motor 4 causing the railroad vehicle to start moving.

From time T2, the first power storage device 16 is continuously charged by the second power conversion device 17, so that the voltage of the first power storage device 16 is increased, and the voltage of the first power storage device 16 is, at time T8, equivalent to the voltage of the first power storage device 16 at time T2 even if charge of the smoothing capacitor 12 results in decrease in the voltage of the first power storage device 16. From time T8, the internal combustion engine 2 can be restarted up.

As described above, the railroad vehicle control device 1 according to Embodiment 1 of the present disclosure has a structure in which the second power conversion device 17 is arranged between: the high voltage circuit including the smoothing capacitor 12; and the low voltage circuit including the second power storage device 19, thereby enabling prevention of unintentional electrical contact between the high voltage circuit and low voltage circuit while supplying electric power to the power generator 3 to start up the internal combustion engine 2. Also the smoothing capacitor 12 is charged with electric power stored in the first power storage device 16, and the internal combustion engine 2 is started up by the electric power stored in the smoothing capacitor 12. Such configuration enables prevention of a situation where a voltage drop occurs when starting up the internal combustion engine 2 and, in consequently, the voltage drop can negatively affect a control device included in the railroad vehicle and connected to the second power storage device 19.

Embodiment 2

Figure 4:
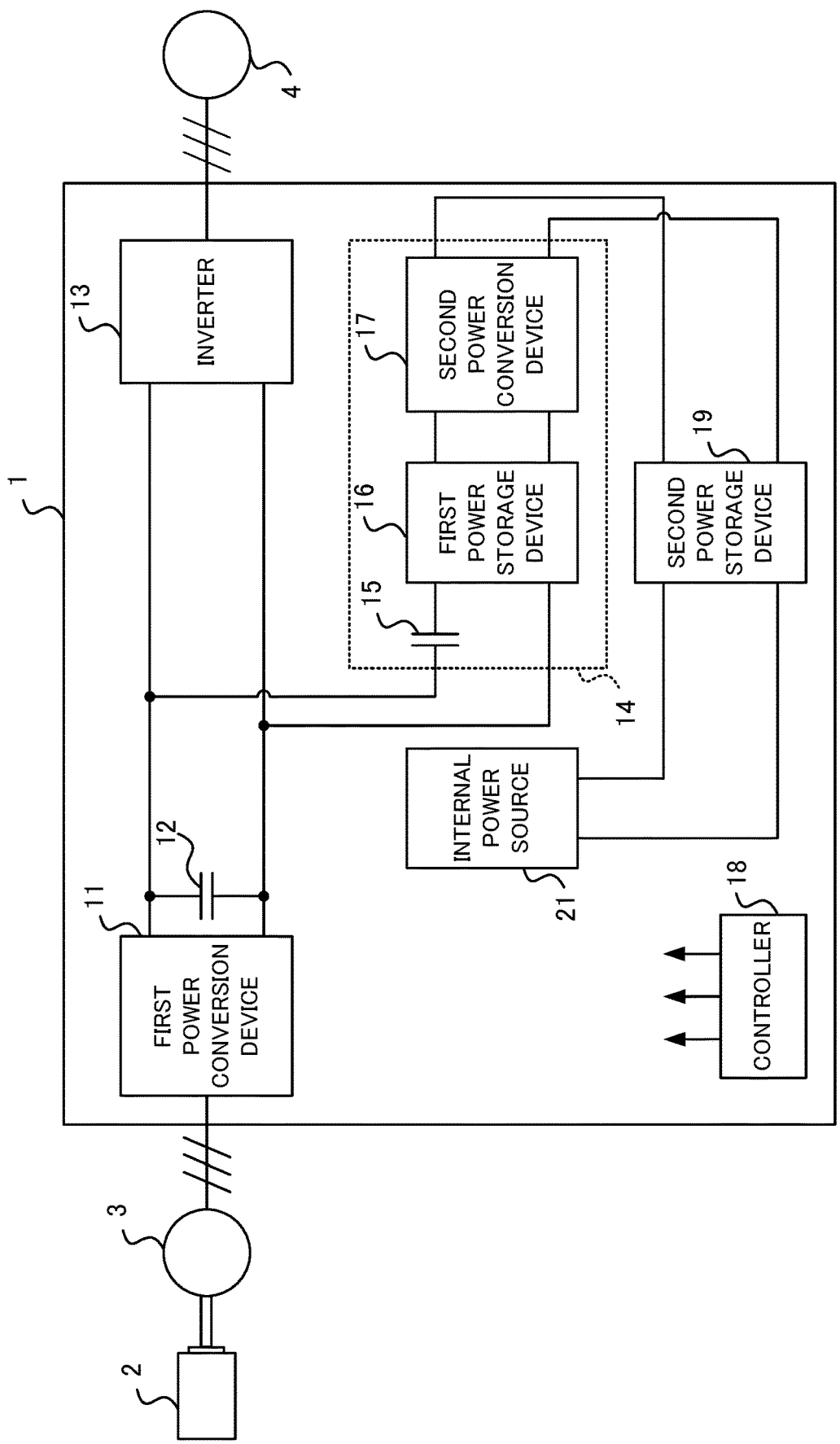
FIG. 4 is a block diagram illustrating an example configuration of a railroad vehicle control device according to Embodiment 2 of the present disclosure.

FIG. 4 is a block diagram illustrating an example configuration of a railroad vehicle control device according to Embodiment 2 of the present disclosure. A railroad vehicle control device 1 according to Embodiment 2 has a configuration in which the second power storage device 19 is supplied with electric power from an internal power source 21 for the first power conversion device 11 or the inverter 13. The internal power source 21 is, for example, a power source for driving a switching circuit or a control relay included in the first power conversion device 11 or inverter 13. Operations of starting up the internal combustion engine 2 by the railroad vehicle control device 1 according to Embodiment 2 are similar to the operations by the railroad vehicle control device 1 according to Embodiment 1. Output of the internal power source 21 is lower than that of the second power storage device 19 usually included in the railroad vehicle control device 1 according to Embodiment 1, the second power storage device 19 supplying electric power to a control device included in the railroad vehicle. Accordingly, such configuration according to Embodiment 2 enables reduction in capacity of the second power conversion device 17, thereby enabling downsizing of the railroad vehicle control device 1.

As described above, the railroad vehicle control device 1 according to Embodiment 2 includes the second power storage device 19 supplied with electric power from the internal power source 21 for the first power conversion device 11 or inverter 13, thereby enabling downsizing of the railroad vehicle control device 1.

Embodiment 3

Figure 5:
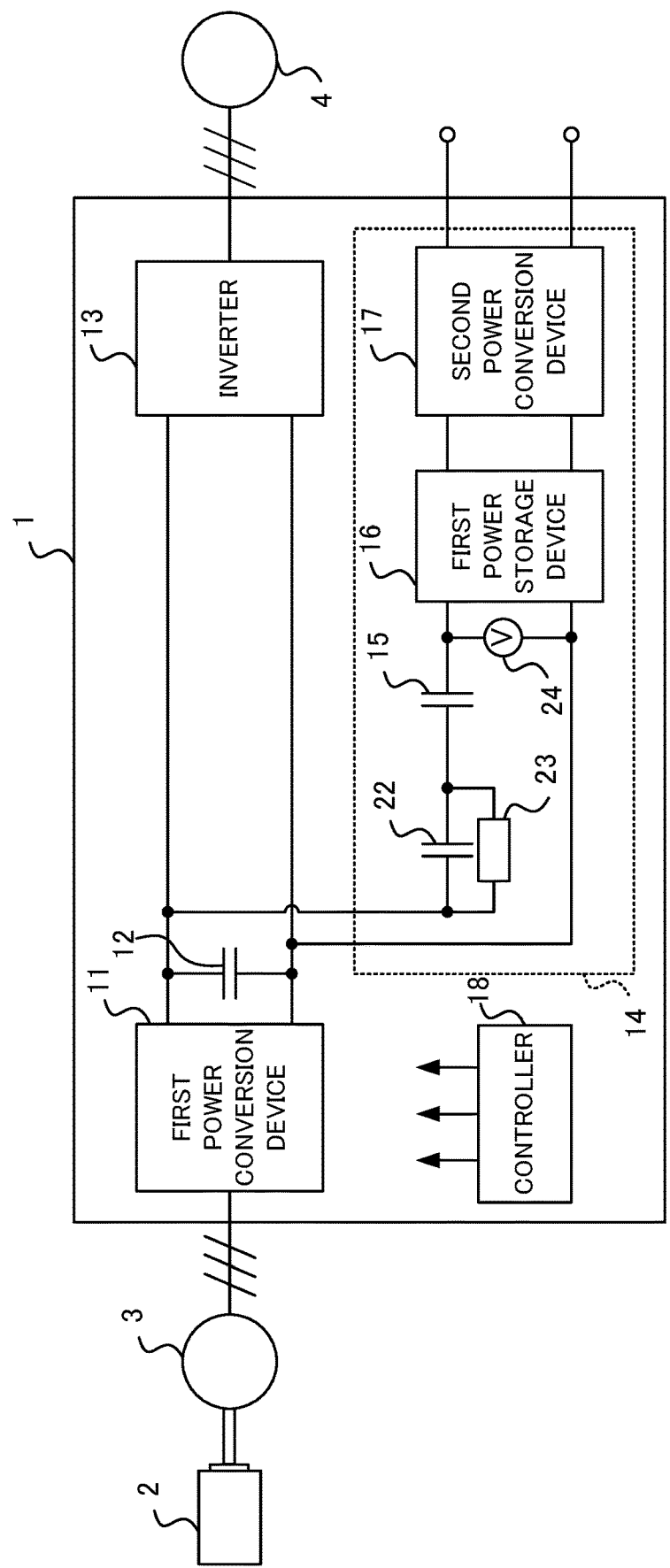
FIG. 5 is a block diagram illustrating an example configuration of a railroad vehicle control device according to Embodiment 3 of the present disclosure.

FIG. 5 is a block diagram illustrating an example configuration of the railroad vehicle control device according to Embodiment 3 of the present disclosure. A railroad vehicle control device 1 according to Embodiment 3 of the present disclosure includes not only the components included in the railroad vehicle control device 1 according to Embodiment 1 illustrated in FIG. 1 but also a second contactor 22 connected to the first contactor 15 in series, a resistor 23 connected in parallel to the second contactor 22, and a voltage detector 24 for detecting voltage of the first power storage device 16.

The railroad vehicle control device 1 according to Embodiment 3 is configured to include the second contactor 22 connected in parallel to the resistor 23, thereby enabling prevention of overvoltage to the first power storage device 16 even if abnormality occurs in either the first contactor 15 or the second contactor 22. While the first power conversion device 11 and the inverter 13 are running to drive the electric motor 4, the voltage across the smoothing capacitor 12 is high. Even if the second contactor 22 is wrongly closed or sticks in the situation where the voltage across the smoothing capacitor 12 is high, the high voltage is never applied to the first power storage device 16 if the first contactor 15 is normally opened. Also, even if the first contactor 15 is wrongly closed or sticks in that situation, an amount of current flowing into the first power storage device 16 is restricted since the resistor 23 is provided, thereby voltage across the first power storage device 16 does not rapidly increase.

The railroad vehicle control device 1 according to Embodiment 3 may be configured to has a structure in which: when the voltage detector 24 included in the railroad vehicle control device 1 according Embodiment 3 detects a voltage across the first power storage device 16 that is beyond a predetermined range, the controller 18 determines that abnormality occurs in the first contactor 15 and the second contactor 22; the controller 18 stops driving the first power conversion device 11 and inverter 13; and then the controller 18 may make the smoothing capacitor 12 discharge electric power. Such a structure according Embodiment 3 makes it possible to protect the first power storage device 16. The above predetermined range may be optionally determined in accordance with the ability of the first power storage device 16 to withstand voltage.

Operations of starting up the internal combustion engine 2 by the railroad vehicle control device 1 according to Embodiment 3 are basically similar to those of the railroad vehicle control device 1 according to Embodiment 1. However, the first contactor 15 is closed and the second contactor 22 is opened when the smoothing capacitor 12 is charged with electric power stored in the first power storage device 16, that is, during the period of time between time T2 and time T3 in FIG. 3. The second contactor 22 is closed after completion of charge on the smoothing capacitor 12, or at time T4 in FIG. 3, thereby the first power storage device 16 is electrically connected to the smoothing capacitor 12. As a result, no voltage drop occurs in the resistor 23, thereby the rated voltage for the first power storage device 16 can be reduced, the rated power for the resistor 23 can be lowered and the railroad vehicle control device 1 can be downsized.

When the rotation speed of the internal combustion engine 2 becomes stable afterward, the first contactor 15 and the second contactor 22 are opened.

The number of such contactors included in the railroad vehicle control device 1 is not limited to two. Also, the railroad vehicle control device 1 according to Embodiment 3 may be configured to include a resistor 23 that is capable of being connected to or disconnected from a circuit and may be connected to the circuit based on conditions that vary depending on the following cases: the case of charge on the smoothing capacitor 12; and the case of start-up of the internal combustion engine 2.

As described above, the railroad vehicle control device 1 according to Embodiment 3 is configured to has a structure in which the second contactor 22 connected in parallel to the resistor 23 is connected to the first contactor 15 in series, thereby enabling prevention of overvoltage to the first power storage device 16.

Embodiment 4

Configurations of a railroad vehicle control device 1 according to Embodiment 4 are basically similar to those of the railroad vehicle control device 1 according to Embodiment 1 illustrated in FIG. 1. However, in Embodiment 4, the internal combustion engine 2 includes a start-up device such as a starter and the railroad vehicle control device 1 excites the power generator 3 that is an induction generator.

Figure 6:
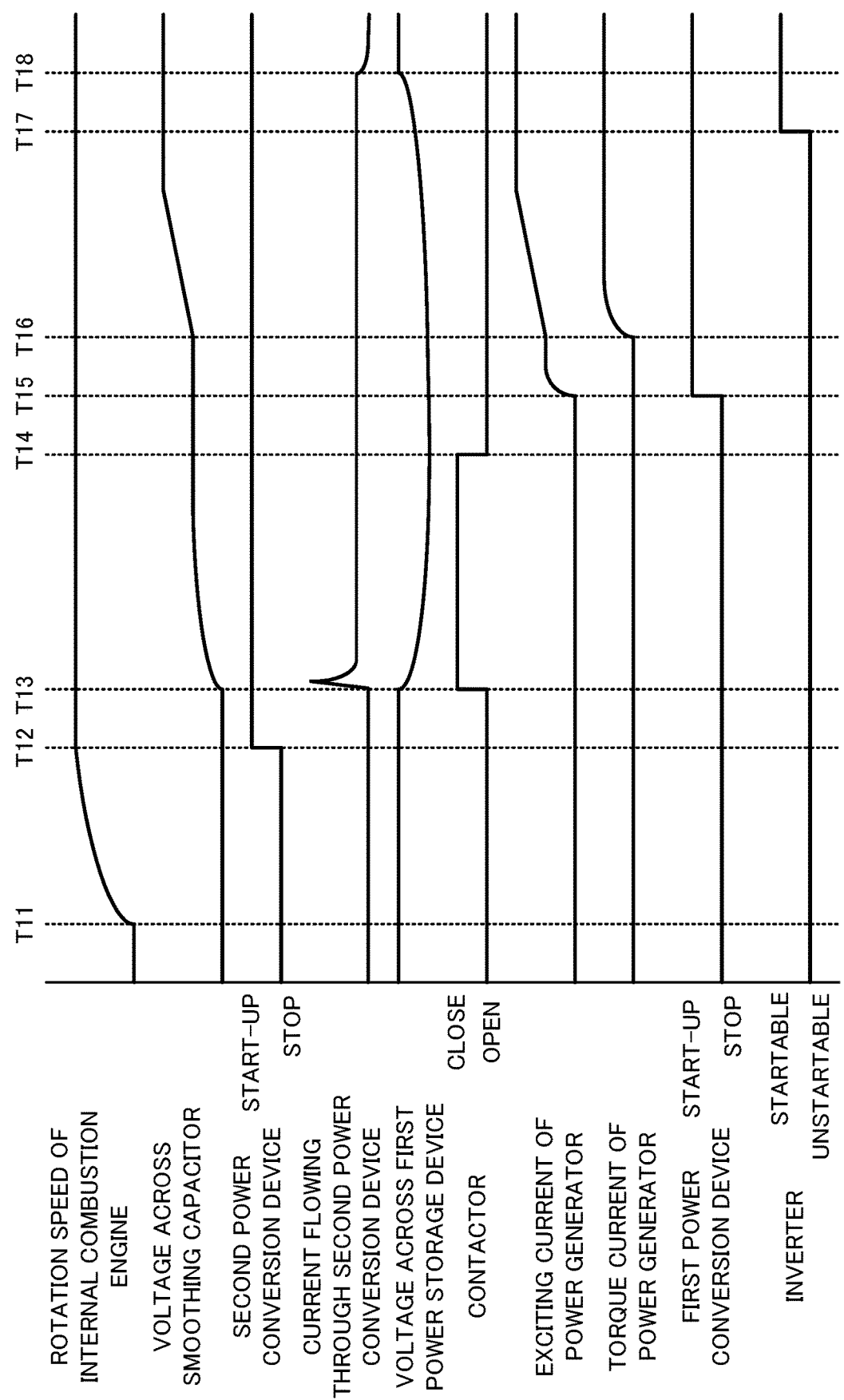
FIG. 6 is a timing chart illustrating operations performed by a railroad vehicle control device according to Embodiment 4 of the present disclosure in starting up an internal combustion engine.

FIG. 6 is a timing chart illustrating operations performed by the railroad vehicle control device according to Embodiment 4 in starting up an internal combustion engine. The start-up device starts up the internal combustion engine 2 at time T11. After a rotation speed of the internal combustion engine 2 becomes stable, the second power conversion device 17 starts up at time T12. The first contactor 15 is closed at T13, thereby charge on the smoothing capacitor 12 starts. When the charge on the smoothing capacitor 12 finishes at time T14, the first contactor 15 opens. The first power conversion device 11 starts up at time T15 to start performing power conversion of electric power stored in the smoothing capacitor 12, and then the first power conversion device 11 supplies the converted electric power as electric power for driving the power generator 3. That is to say, exciting current flows from the first power conversion device 11 to the power generator 3. Afterward, the first power conversion device 11 applies current for torque at time T16 to start performing constant voltage control, triggering the power generator 3 to start generating electric power. The controller 18 controls the first power conversion device 11, thereby the first power conversion device 11 starts converting electric power supplied from the power generator 3 so that the voltage of the smoothing capacitor 12 has a constant value. As a result, the inverter 13 is put in a state in which the inverter 13 can be started up, at time T17. As in Embodiment 1, the voltage across the first power storage device 16 is increased, and the voltage across the first power storage device 16 is, at time T18, equivalent to the voltage across the first power storage device 16 at time T12. The internal combustion engine 2 can be restarted up from time T18.

As described above, the railroad vehicle control device 1 according to Embodiment 3 is configured to include the second power conversion device 17 arranged between: the high voltage circuit including the smoothing capacitor 12; and the low voltage circuit including the second power storage device 19, thereby enabling excitation of the power generator 3 while preventing unintentional electrical contact between the high voltage circuit and the low voltage circuit.

Embodiments according to the present disclosure are not limited to the aforementioned embodiments, and any combination of the configurations according to the aforementioned embodiments may be used to achieve a railroad vehicle control device according to the present disclosure. Configurations for the first power conversion device 11 and the second power conversion device 17 are not limited to the configurations according to the aforementioned embodiments. Any circuit capable of converting electric power with the input side and output side thereof insulated from each other, such as an AC-DC converter, may be used as the second power conversion device 17.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Railroad vehicle control device
2 Internal combustion engine
3 Power generator
4 Electric motor
11 First power conversion device
12 Smoothing capacitor
13 Inverter
14 Start-up controller
15 First contactor
16 First power storage device
17 Second power conversion device
18 Controller
19 Second power storage device
20 SIV
21 Internal power source 22 Second contactor
23 Resistor
24 Voltage detector

The invention claimed is:

1. A railroad vehicle control device comprising:
a first power conversion device to perform bidirectional power conversion between a primary side and a secondary side of the first power conversion device, the primary side of the first power conversion device being connected to a power generator driven by an internal combustion engine to generate alternating current;
a smoothing capacitor connected to terminals of the secondary side of the first power conversion device;
a second power conversion device to convert electric power supplied from a power source connected to an input side of the second power conversion device with the input side and an output side of the second power conversion device insulated from each other, and to output the converted electric power;
a first power storage device connected in parallel to the smoothing capacitor between the terminals of the secondary side of the first power conversion device and connected between terminals of the output side of the second power conversion device, the first power storage device being charged with electric power output by the second power conversion device;
a first contactor to switch on and off an electrical pathway between the smoothing capacitor and the first power storage device, wherein the first power storage device is coupled between the first contactor and the second power conversion device; and
a controller to control the first power conversion device and the second power conversion device,
wherein, after the smoothing capacitor is charged with electricity stored in the first power storage device as a result of closing the first contactor, the controller controls the first power conversion device to cause the first power conversion device to convert electric power stored in the smoothing capacitor to supply the converted electric power as electric power for driving the power generator.

2. The railroad vehicle control device according to claim 1, wherein, after the internal combustion engine is started up by torque output by the power generator to which electric power is supplied from the first power conversion device, the first contactor is opened and the controller controls the first power conversion device to cause the first power conversion device to convert electric power supplied from the power generator to output the converted electric power.

3. The railroad vehicle control device according to claim 1, wherein the power source connected to the input side of the second power conversion device is a second power storage device charged by a transfer circuit performing power conversion of electric power supplied to the terminals of the secondary side of the first power conversion device while driving the power generator with the input side and the output side of the second power conversion device insulated from each other.

4. The railroad vehicle control device according to claim 1, wherein the power source connected to the input side of the second power conversion device is an internal power source for the first power conversion device or an internal power source for a power consuming device connected to the secondary side of the first power conversion device.

5. The railroad vehicle control device according to claim 1, wherein a second contactor connected to a resistor in parallel is connected to the first contactor in series.

6. The railroad vehicle control device according to claim 1, wherein
the power generator is an induction generator,
the first contactor is opened after the internal combustion engine is started up by an external start-up device, and
the controller controls the first power conversion device with the first contactor opened, to cause the first power conversion device to convert electric power stored in the smoothing capacitor, and to supply the converted electric power to the power generator, thereby exciting the power generator.

* * * * *